United States Patent Office.

JOHN M. WILSON, OF SEGUIN, TEXAS.

*Letters Patent No.* 74,871, *dated February* 25, 1868; *reissue No.* 3.166, *dated October* 20, 1868.

IMPROVED COSMETIC.

The Schedule referred to in these Letters Patent and making part of the same.

*To all whom it may concern:*

Be it known that I, JOHN M. WILSON, of Seguin, and State of Texas, have invented a new and useful Improvement in Cosmetics; and I do hereby declare the following to be a full, clear, and exact description of the same.

This invention or discovery relates to a new and useful improvement in the composition of a cosmetic for removing freckles or tan-discoloration from the skin, by which the complexion is improved, and promoting the general purity and cleanliness of the whole person, and also removing all unpleasant odors from the mouth or other parts of the body.

This improvement consists in combining certain chemical ingredients, and making a solution thereof, with which the skin is wet, for the purpose aforesaid, without injury to the tissue.

The formula for the preparation of my cosmetic is as follows:

I take any of the alkaline chlorides, or chlorinated alkalies in solution, suitably diluted, so as to not injure the tissue of the skin in its application, to be followed and alternated with an acidulous wash, as hereafter described.

I prefer combining, for better effect, the chlorides of soda and potash, prepared in either of the following ways:

First, take two (2) pounds of carbonate of soda, and a half (½) pound of carbonate of potash, dissolved in a half gallon of rain or distilled water, warmed. I then take two and a half (2½) pounds of chloride of lime, or enough to saturate the alkaline solution with chlorine. The chloride of lime, reduced fine, is dissolved in warm water, one and a half (1½) gallon, and frequently agitated, for two or three days. It is then carefully decanted, and strained or filtered, and mixed with the alkaline solution. After this, I take two ounces of soda, and one of potash, and dissolve them in a pint of warm water, and add it to the chlorinated alkaline solution, to give the alkalies the predominance. This excess of alkali gives greater permanence to the chlorine combination; or, Second, I take the alkalies, dissolved, as above described, in a gallon of water, and saturate the solution by generating the chlorine-gas in the usual manner, as for the manufacture of chloride of lime, passing it through water, to free it from muriatic acid.

In every respect, the last mode of obtaining the chlorinated liquor is the best, as the chloride of lime is variable in its quantity of chlorine.

In manufacturing on a large scale, passing the chlorine-gas directly into the alkaline solution is much to be preferred.

As in the other case, a suitable amount of alkaline solution must be added, to give it a preponderance over the neutral chlorinated solution.

The chlorinated alkaline solution, consisting of one or more alkalies, is the wash as a cosmetic, alternated with an acid wash, to be hereinafter described.

The cosmetic, thus prepared, is applied to the skin of the face, neck, hands, or any part of the body, with the hands, or a sponge, or any convenient mode of wetting it. Considerable friction should be used in its application, and then left to be dried, after which the acidulous wash, about as acid as weak vinegar, should be applied over the surface with friction.

In ordinary cases, the wash may be diluted, two or three times its volume, with pure water. When there is no abrasion of the skin, it may be applied pure or slightly diluted.

The effect of the cosmetic is greatly increased by keeping the skin moist.

Gloves of cloth may be moistened with it, and worn with others over them.

Cloth moistened with it may be applied over the face, neck, &c., supported by masks, or some impervious covering.

The cosmetic should always be alternated with the acidulous wash.

These last directions apply where a prompt and decided effect is desired.

The cosmetic, diluted with water, applied as above described, followed with the acid, will produce a soft, clear, white, and delicate complexion. Most of the acids will answer for the acidulous wash, but the class of acids preferred are those which dissolve or combine with the oxide of iron, and discharge its color, viz, oxalic, tartaric, and citric. I prefer to use tartaric and citric combined in the proportion of one-quarter citric to three-quarters tartaric, though either alone will answer. I use about one pound of the acids to about three gallons of pure water, which makes the water sufficiently acid for the purpose.

Any of these acids combine with the chlorinated compound, and free the chlorine from its combination, to discharge its office of whitening the skin. At the same time the oxalates, or tartrates, or citrates of soda and potash are formed, which operate in aid of it by dissolving any deposit of the oxide of iron in the skin, which discolors it.

As an adjunct to the chlorinated alkaline wash, a solution of about one-fourth (¼) of a pound of borax may be added to the gallon. The borax should be dissolved in the minimum quantity of water, *i. e.*, one pint.

Borax is a powerful solvent and antiseptic, and thus aids in increasing the object aimed at.

The proportions of the ingredients may be the same, or varied, without changing materially its effect.

The chlorinated liquor should be kept in dark or colored bottles.

The various ingredients, as described, do no injury to the tissue of the skin, but, on the contrary, are decidedly beneficial.

What I claim, and desire to secure by Letters Patent, is—

1. The chlorinated alkalies, or the alkaline chlorides, used as a cosmetical agent, in manner and for the purposes substantially as set forth.

2. The chlorinated alkalies, or the alkaline chlorides, in combination with any acidulous wash.

3. The chlorinated alkalies, or alkaline chlorides, in connection with an acidulous wash, made from either oxalic, tartaric, or citric acid, either separate or combined, substantially as described.

In testimony that I claim the foregoing as my own, I affix my signature in presence of two witnesses.

JOHN M. WILSON.

Witnesses:
C. C. RAYMOND,
HENRY MANBY.